(12) United States Patent
Jung

(10) Patent No.: US 8,474,179 B2
(45) Date of Patent: Jul. 2, 2013

(54) PLANT POT WITH NESTING PLATES

(76) Inventor: Man-Young Jung, Pasadena, CA (US)

( * ) Notice: Subject to any disclaimer, the term of this patent is extended or adjusted under 35 U.S.C. 154(b) by 1107 days.

(21) Appl. No.: 11/493,236

(22) Filed: Jul. 26, 2006

(65) Prior Publication Data

US 2008/0022591 A1    Jan. 31, 2008

(51) Int. Cl.
*A01G 9/02*          (2006.01)
(52) U.S. Cl.
USPC ............................................................ 47/65.6
(58) Field of Classification Search
USPC ......................................... 47/66.2, 71, 75, 73
See application file for complete search history.

(56) References Cited

U.S. PATENT DOCUMENTS 3,841,021 A * 10/1974 Ferrand ............................. 47/71
5,471,788 A * 12/1995 Willes ................................ 47/75
6,694,671 B2 * 2/2004 Vahrmeyer ..................... 47/65.5
6,862,844 B1 * 3/2005 Rubicz ............................... 47/71

* cited by examiner

*Primary Examiner* — Monica Williams
(74) *Attorney, Agent, or Firm* — Clement Cheng

(57) ABSTRACT

A plant pot is provided comprising a first plant pot housing with an open bottom; a first plate member supported by the first plant housing at its open bottom, wherein the first plate member is separated from the plant pot during transplanting; and a second plate member nesting with the first plate member after the first plate member is separated from the plant pot, wherein the first and second plate members are supported by a second plant pot housing also having an open bottom to complete a sequence of transplanting.

15 Claims, 4 Drawing Sheets

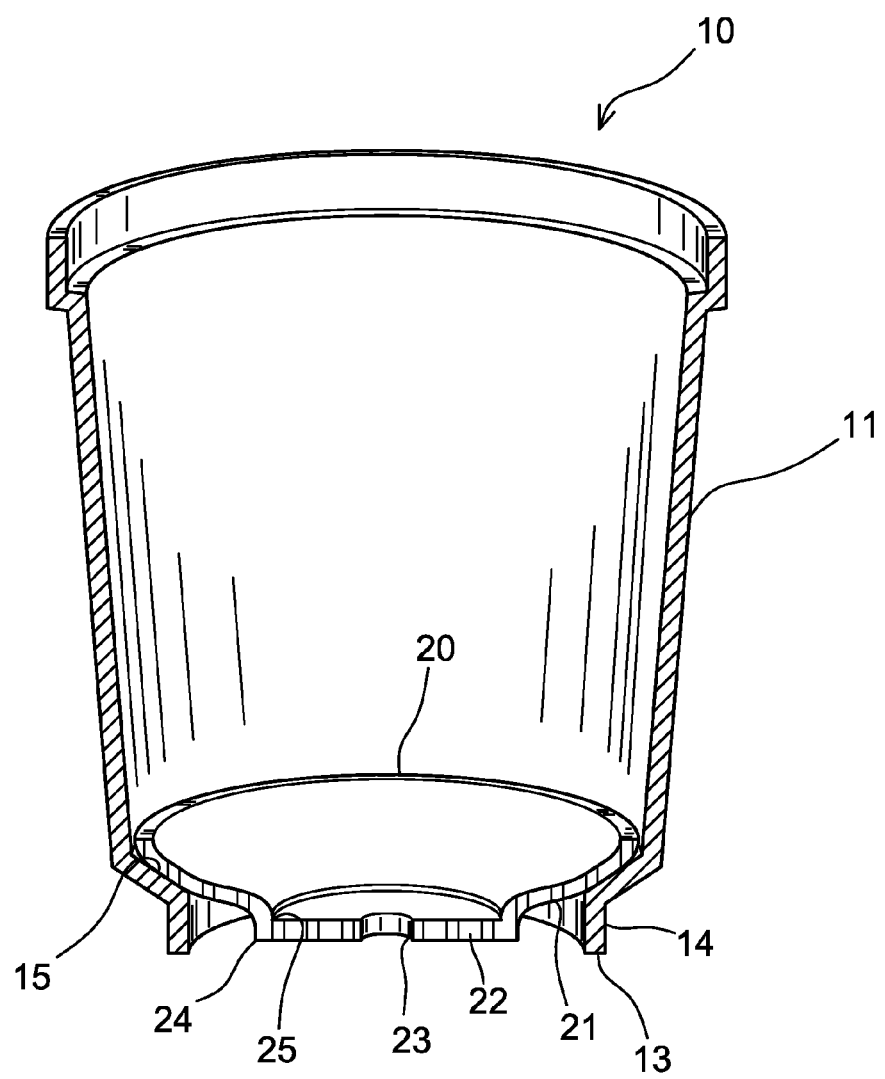

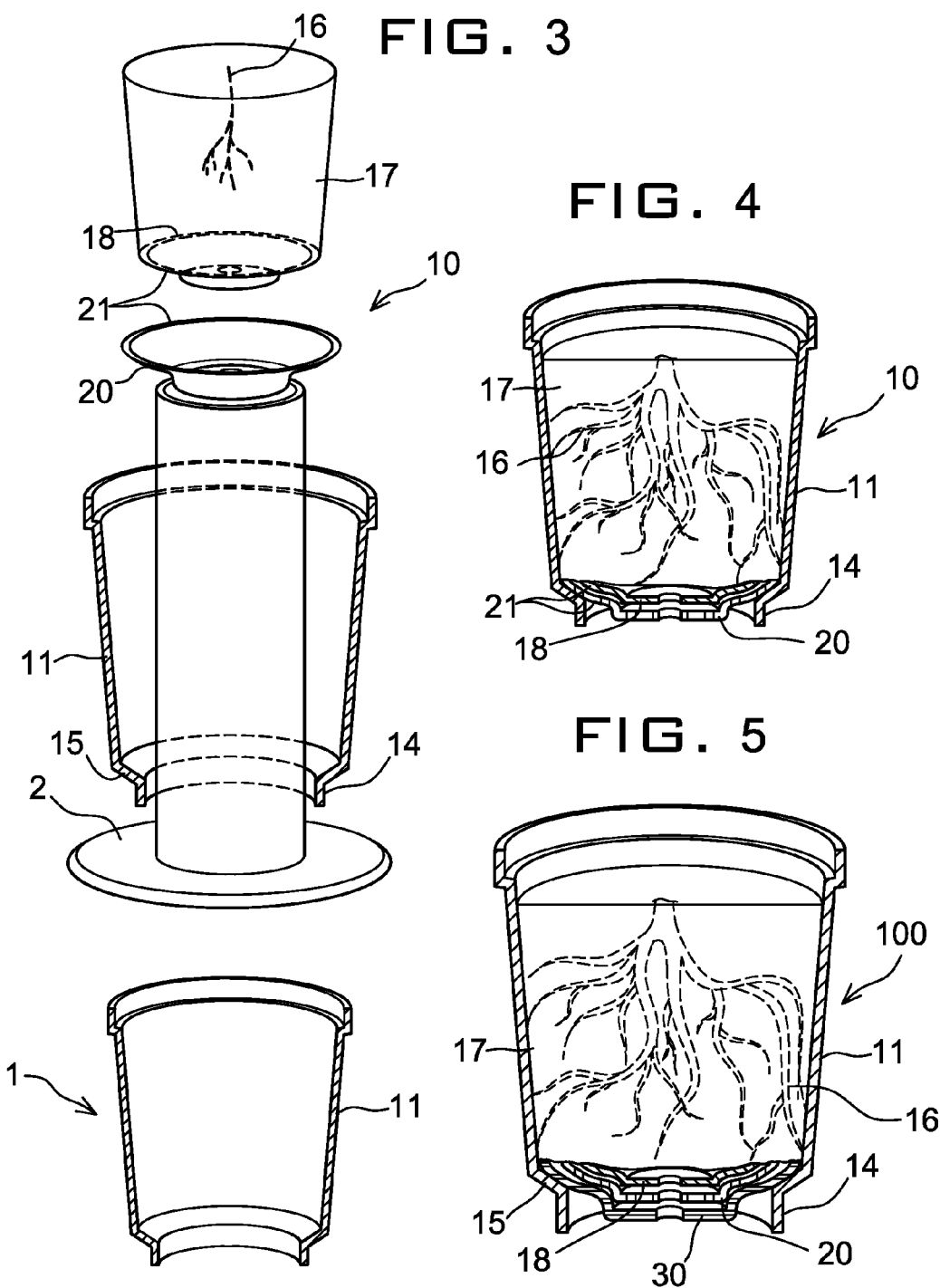

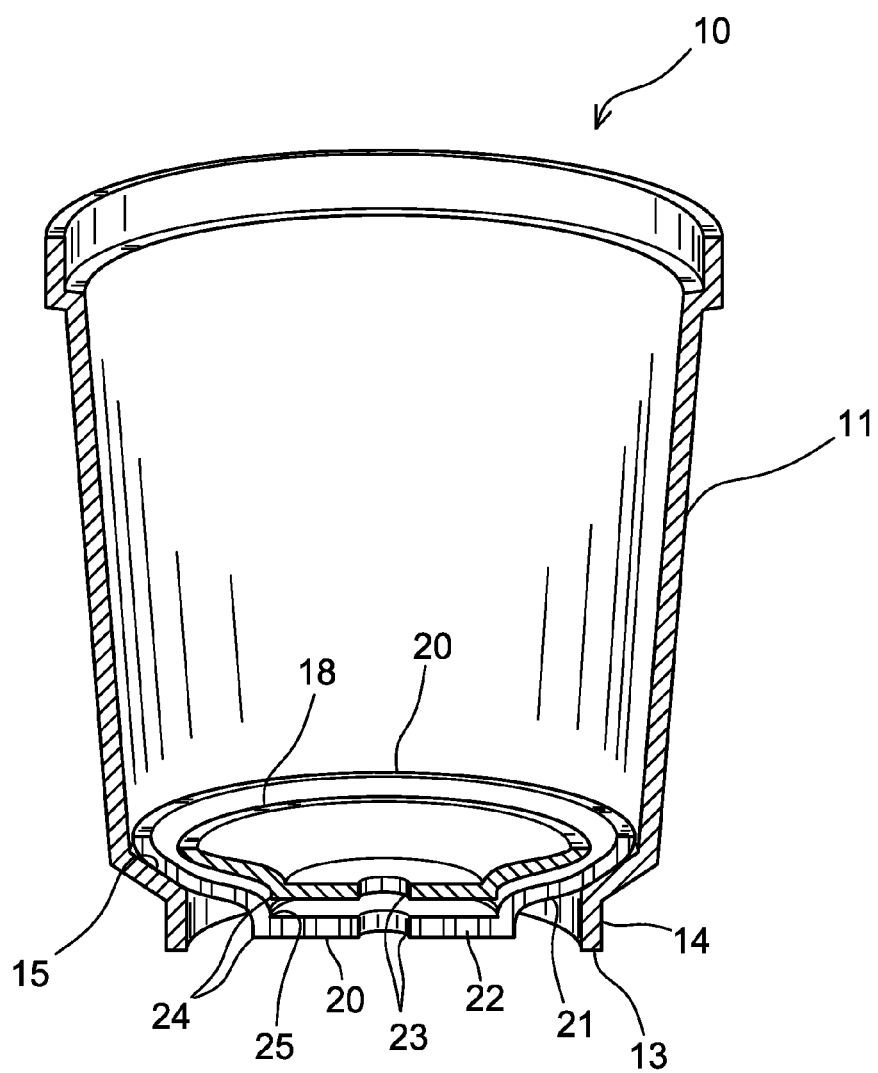

PLANT POT WITH NESTING PLATES

BACKGROUND OF THE INVENTION

A. Field of the Invention

The present invention relates to transplants in gardening. More particularly, the present invention relates to a plant pot free of replanting shocks through improved re-potting structure for household and plant shop uses.

B. Description of the Prior Art

Transplanting between pots or re-potting should be timely performed as the plant needs more room to grow in a bigger pot or when a plant buyer prefers to have a plant in a better pot, which is not necessarily bigger than the current container.

A commonly cited difficulty with transplanting is the physical weakness of the plants, which are threatened into harms or even plant deaths due to mishandling while their roots and soil are exposed during fumbling under inexperienced hands with frequently stubborn plant pots. Various pot structures to improve re-potting have been suggested and U.S. Pat. No. 4,232,482 describes that a drainage plate is removably supported in a transplant container to cover its bottom opening. The plate is pushed upwardly for displacing a volume of soil and a rooted plant through the open top end of the pot.

U.S. Pat. No. 4,027,429 suggests removing a rooted plant from its pot using a plate pushed upwardly through cylindrical shell of the pot.

U.S. Pat. No. 579,295 to Delzell shows a flowerpot having a two pot halves and a separable bottom, by which plant and soil may be carried to a transplanting place or into another pot where the soil is removed from the bottom.

U.S. Pat. No. 3,147,569 to Murguia provides flexible containers for nursery plants which may be repeatedly assembled and disassembled for compact shipping or storage and which may be easily removed from around the root ball of a plant for transplanting.

U.S. Pat. No. 3,362,105 to Steiger provides a flowerpot liner locked in the pot wrapping the soil and plant. For transplanting, the liner is unlocked to release the soil and plant and eventually removed therefrom before being transferred to a larger pot.

U.S. Pat. No. 3,432,027 to Mueller is directed to a dispensing container assembly of a push-up type for raising ice cream or the like having its bottom surface temporarily sealed until it is punctured by a push stick to position the desert at a convenient height to eat.

There have been known solutions to transplanting by incorporating an open pot member and a separate bottom for resting in the pot member. However, in application to living fragile plants they fail to offer an uninterrupted and sophisticated protection of the plant during re-potting by leaving the plant and soil completely exposed to atmosphere for different durations of time. In other words, upon departing from their supporting bottom members of old pots and before relocating to a new location the plants are supposed to be grasped by hands at any parts thereof and any moment of time to diminish the benefits anticipated by the respective structural improvements of the pots.

In view of the shortcomings of prior arts, an object of the present invention is to provide a safer plant pot structure that reduces any anticipated physical impacts upon bare plants before and after the transplanting while eliminating human mishandlings of the plant.

Another object of the present invention is to provide an inexpensively simple but flawless plant repot system.

Yet another object of the present invention is to provide a very easy pot to perform transplant as quickly and often as necessary in commercial nurseries without harming the plants.

SUMMARY OF THE INVENTION

A plant pot according to the present invention comprises a first pot housing with cylindrical sidewalls converging downwardly and opened at its top and bottom for surrounding a plant; a first plate member held against the interior of the side walls of the first pot housing near the open bottom for supporting the plant, wherein the first plate member is separable from the first pot housing along with the plant during transplanting; and a second plate member nesting with the first plate member after the first plate member is separated from the first pot housing, wherein the second plate member is adaptable to fit in a fresh pot housing of the same structure as the first pot housing in the same or higher scale.

The plate members of different sizes are optimized for re-potting. Each plate becomes a bottom closure of the pot housing and has an upper side attached semi-permanently to the planted soil and a lower side seated within the pot housing or nested with a second bigger repot plate seated in its second bigger pot housing with an automatic centering thanks to the frusto-conical shape of the plate member. The automatic centering means keeps the plant straight while filling with new dirt to accommodate the larger pot.

BRIEF DESCRIPTION OF THE DRAWINGS

FIG. 2 is a perspective view with a vertical section of the center of the plant pot of FIG. 1, having only one plate before transplanting.

FIG. 3 is a view showing a first process of transplanting after the plant and soil are withdrawn from the first container and ready for a second larger pot.

FIG. 4 is a perspective view with a vertical section of the center of the second plant pot with two plates nested at the bottom of the planted soil, which is the configuration after one transplant.

FIG. 5 is a perspective view with a vertical section of the center of a third plant pot with three nested plates at the bottom of the planted soil, which is the configuration after two transplants.

FIG. 6 is a perspective view with a vertical section of the center of the plant pot of FIG. 1 with the planted soil removed and with two nested plates after transplanting.

Similar reference numbers denote corresponding features throughout the attached drawings.

DETAILED DESCRIPTION OF THE PREFERRED EMBODIMENT

Figure 1:
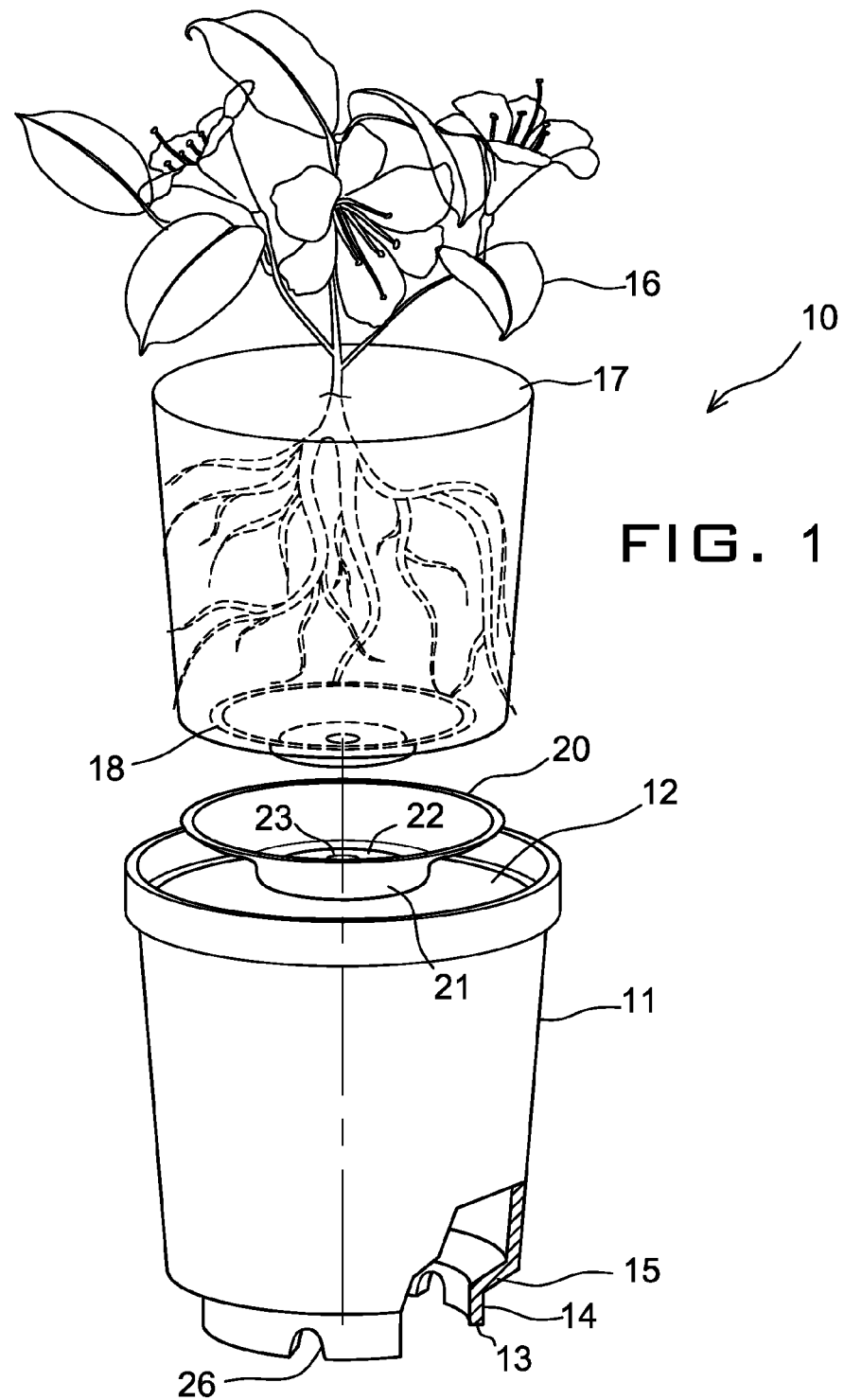
FIG. 1 is an exploded perspective view, partly in section, of a plant pot according to the present invention.

FIG. 1 shows a pot 10 according to an embodiment of the present invention. To illustrate a unique re-potting operation permitted by the pot 10, it is shown under a first of a series of transplant events. So, the pot 10 may be hypothetically a second pot that replaces an outgrown first pot, which is basically identical in structure to the pot 10.

The pot 10 is comprised of sidewalls 11 having an open top 12 and a bottom end 13, which is opened in a reduced diameter. The pot 10 may be made of common material used to form currently available plant pots such as clay, plastic, wood, metal and combination of these.

The bottom side 13 is terminated by a neck 14, which is connected through a shoulder 15 to the sidewalls 11. The shoulder 15 faces upwardly to provide an engaging surface to hold the soil 17 in the pot 10.

The sidewalls 11 may be rounded in cross section or multi-faceted such as four-sided, hexagonal, pentagonal, etc. Also, the sidewalls 11 may be conical so that the top 12 opens wider than the bottom side 13 to facilitate planting and removal of a plant 16 with the soil 17 when it is pushed at its bottom out of the pot 10 at another transplant event in the future.

A first stackable plate or plate 18 covers the bottom of the soil 17 and has become an integral part thereof after it has been derived from the earlier pot assembly.

A second stackable plate 20 is provided to sit on the shoulder 15 of the pot 10. Both plates 18, 20 may be formed of selected one of the materials available for making the pot 10. It is contemplated that once the plate 18 engages the planted soil 17, they are gradually transfixed to each other over a number of watering activities followed by repetitive dries. Though not shown in the drawings, the upper surface of the plate 18 facing the soil 17 may be formed with various embossing patterns to enhance the natural bonding with the conforming soil 17. According to the present invention, the plate 18 may hold onto the soil 17 and plant 16 through its life, and importantly, during every transplants unless it is necessary to shave off excessively grown root.

In contrast, the bottom surface of the plate 18 is shaped to allow nesting with plate 20, the fresh bigger plate that pairs with the bigger pot 10. Dimensional increment between pots may be 5 to 6 cm in diameter. In order to drain water naturally from the soil 17 and facilitate nesting between pots, the plate 20 has frusto-conical sidewalls 21 that merge into a flat bottom 22. At the center of the flat bottom 22 is formed an opening 23 to pass water flowing down to the atmosphere as shown in vertical section in FIG. 2. Similar opening 23 is also formed in the center of the plate 18.

The plate 18 has an annular right-angled edge 24 at its bottom side facing outwardly while the plate 20 has a matching corner 25 at the junction of the sidewalls 21 and bottom 22 so that two plates 18, 20 may be press fitted together automatically due to the weight of the soil unto the plates 18, 20 against the shoulder 15. Though, throughout the drawings the plates 18, 20 are shown with clearances between them to clearly distinguish one from the adjacent other in the stack. Alternatively, the plates 18, 20 may be formed with matching patterns of prominences and depressions at the opposites surfaces to mate them together.

It is well known to use an oversized plate or saucer (not shown for simplicity) for holding the water drained to protect furniture or other facilities from staining as well as for reserving some evaporative water back to the plant 16. In some cases where a floor to lay the pot 10 is irregular, using the saucer also prevents any pressures upon the soil plug 17 forcing the same off the pot 10.

To allow for a free flow of water, the flat bottom 22 of the lower plate 20 is positioned above the level of the bottom edge 13 of the neck 14, which may have several notches 26 communicating the interior of the neck 14 to its exterior.

In operation of the inventive pot at re-potting sessions as shown in FIG. 3, the planted soil 17 having the underlying plate 18 may be laid on the new plate 20, which may be supported by an upright stand 2 for mounting the new pot 10 after the soil 17 has been lifted out of the sidewalls 11 of an outgrown pot 1. The stand 2 in a simpler form may be a cut length of a supported plastic pipe with a smaller diameter than that of the neck 14 of the pot 11. Any makeshift post such as a log will work as well. For occasional re-potting of light plants, two hands are sufficient to achieve the best transplanting results according to the present invention.

If a re-potting is to simply replace a damaged or unsightly pot, old plate 18 preferably remains to eliminate unnecessary exposure of the plant 16. When the transplanting is performed to accommodate the growth of the plant 16, the plate 20 of a larger size is brought under the plate 18 of the soil 17 so that they are nested with each other and automatically aligned about a common center thanks to the frusto-conical sidewalls 21 of both plates 18, 20. While keeping the soil 17 intact at its bottom by touching only the plate 18 and in turn the plate 20, they are encased by the sidewalls 11 of the pot 10 from below. As the soil 17 is held up on the stand 2 the sidewalls 11 may be lifted until the sidewalls 21 bear against the shoulder 15 of the pot 10.

A second re-potting from the pot 10 to an even bigger pot 100 may be done through the same process described above with an addition of third plate 30 located between the shoulder 15 of the pot 100 and the bottom plate 20 of the soil 17. Successively larger pots can be used according to plant growth.

By turning the otherwise vulnerable bottom surface of the soil 17 into a well clad handling center using nested plate re-potting a plant will be no more a major life threatening event to the plant 16 according to the present invention. The present invention provides automatic centering between the plates so that the plant will transplant straight, and not tip over to any particular side. The surface of the plate can be rough allowing roots to grow against the surface of the plate so that the plate retains the bottom of the plant root structure.

Therefore, while the presently preferred form of the plant pot has been shown and described, and several modifications thereof, persons skilled in this art will readily appreciate that various additional changes and modifications may be made without departing from the spirit of the invention, as defined and differentiated by the following claims. It is to be understood that the present invention is not limited to the sole embodiment describe above, but encompasses any and all embodiments within the scope of the following claims. For example, the structure can be easily modified to accommodate square pots and square plates or oval plates.

Call Out List Of Elements
1, 10, 100: Plant Pot
2: Stand
11: Sidewalls
12: Open Top
13: Bottom End
14: Neck
15: Shoulder
16: Plant
17: Soil
18: First plate
20: Second plate
21: Frusto-conical Sidewalls
22: Flat Bottom
23: Opening
24: Right-angled Edge
25: Corner
26: Notch
30: Third plate

The invention claimed is:
1. A plant pot comprising:
a first plant pot housing with an open bottom;
a first plate member supported by the first plant housing at its open bottom, wherein the first plate member is separated from the plant pot during transplanting; and a second plate member nesting with the first plate member after the first plate member is separated from the plant housing, wherein the first and second plate members are supported by a second plant housing and also have an open bottom to complete a sequence of transplanting;

wherein the first plant housing is a first pot that has a first bottom side terminated by a first neck, which is connected through a first shoulder to first sidewalls, wherein the first shoulder faces upwardly to provide a first engaging surface, wherein the first plate member is adapted to rest on the first engaging surface of the first shoulder before transplantation;

wherein the second plant housing is a second pot that has a second bottom side terminated by a second neck, which is connected through a second shoulder to second sidewalls, wherein the second shoulder faces upwardly to provide a second engaging surface, wherein the second plate member is adapted to rest on the second engaging surface of the second shoulder;

wherein the first plate member nests with and rests on top of second plate member after transplantation, wherein the first plate member continuously supports the plant soil and is not detached from the plant soil during transplantation, wherein the first plate member and second plate member have frusto-conical sidewalls that merge into a flat bottom.

2. The plant pot of claim 1, wherein the first and second plate members have frusto-conical sidewalls that mate together and provide automatic centering, wherein the first and second plate members are circular disk shaped.

3. The plant pot of claim 1, wherein the first and second plate members have sidewalls that mate together and provide automatic centering.

4. The plant pot of claim 1, wherein the first and second plate members mate together and provide automatic centering.

5. The plant pot of claim 1, further comprising:
a third plant pot housing with an open bottom;
a third plate member supported by the third plant housing at its open bottom, wherein the third plate member is separated from the plant pot during transplanting; and wherein the second plate member connects with the third plate member after the second plate member is separated from the second plant housing.

6. A plant pot for replacement with at least one fresh pots in transplanting comprising:
a first pot housing with cylindrical sidewalls and opened at its top and bottom for surrounding a plant; a first plate member held against the interior of the sidewalls of the first pot housing near its open bottom for supporting the plant, wherein the first plate member is separable from the first pot housing along with the plant during transplanting; and
a second plate member nesting with the first plate member after it is separated from the first pot housing, wherein the second plate member is adaptable to fit in a fresh pot housing similar to the first pot housing in the same or greater scale;

wherein the first plant housing is a first pot that has a first bottom side terminated by a first neck, which is connected through a first shoulder to first sidewalls, wherein the first shoulder faces upwardly to provide a first engaging surface, wherein the first plate member is adapted to rest on the first engaging surface of the first shoulder before transplantation;

wherein the second plant housing is a second pot that has a second bottom side terminated by a second neck, which is connected through a second shoulder to second sidewalls, wherein the second shoulder faces upwardly to provide a second engaging surface, wherein the second plate member is adapted to rest on the second engaging surface of the second shoulder;

wherein the first plate member nests with and rests on top of second plate member after transplantation, wherein the first plate member continuously supports the plant soil and is not detached from the plant soil during transplantation, wherein the first plate member and second plate member have frusto-conical sidewalls that merge into a flat bottom.

7. The plant pot of claim 6, wherein the second pot housing has the same structure and size as the first pot housing and is a replacement of the first pot housing.

8. The plant pot of claim 6, wherein the second pot housing is similar to the first pot housing except its exterior design and/or material to change the aesthetical value of the plant pot.

9. The plant pot of claim 6, wherein the second pot housing has the same structure as the first pot housing but a greater scale to adapt to the growth of the plant through re-potting.

10. The plant pot of claim 6, further comprising incremental sizes of pot housings and a series of matching plate members with corresponding diameters, the plate members nesting with an earlier stack of plate members concentrically positioned in the fresh pot housing.

11. The plant pot of claim 6, further comprising a third plant pot housing with an open bottom; a third plate member supported by the third plant housing at its open bottom, wherein the third plate member is separated from the plant pot during transplanting; and wherein the second plate member connects with the third plate member after the second plate member is separated from the second plant housing.

12. The plant pot of claim 11, wherein the second pot housing has the same structure and size as the first pot housing and is a replacement of the first pot housing.

13. The plant pot of claim 11, wherein the second pot housing is similar to the first pot housing except its exterior design and/or material to change the aesthetical value of the plant pot.

14. The plant pot of claim 11, wherein the second pot housing has the same structure as the first pot housing but a greater scale to adapt to the growth of the plant through re-potting.

15. The plant pot of claim 11, further comprising incremental sizes of pot housings and a series of matching plate members with corresponding diameters, the plate members nesting with an earlier stack of plate members concentrically positioned in the second pot housing.

* * * * *